Oct. 5, 1971 L. J. MARTIN 3,609,908
FISHING LINE SINKER
Filed Dec. 18, 1969
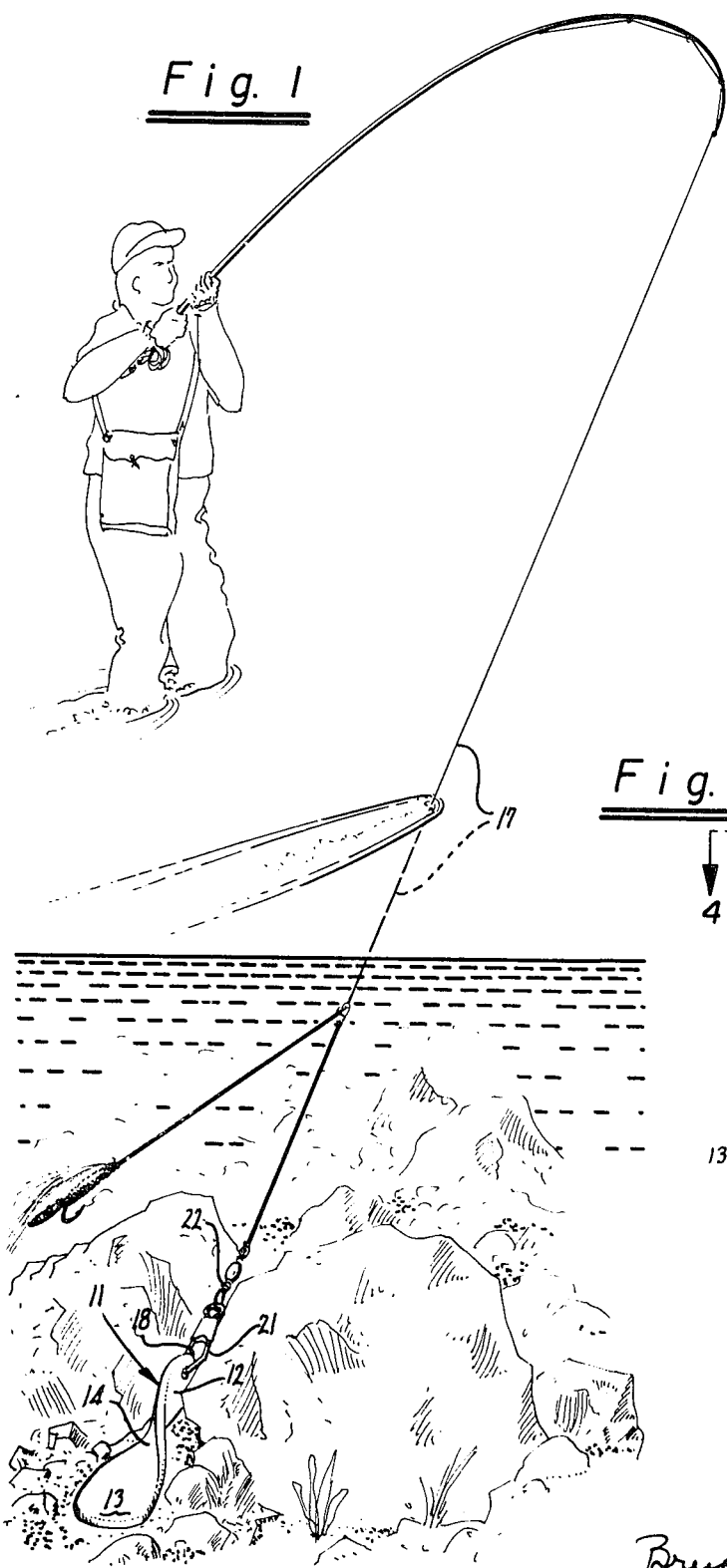
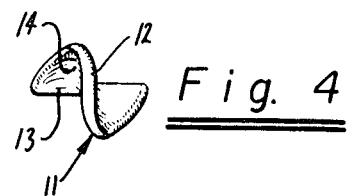
Fig. 4
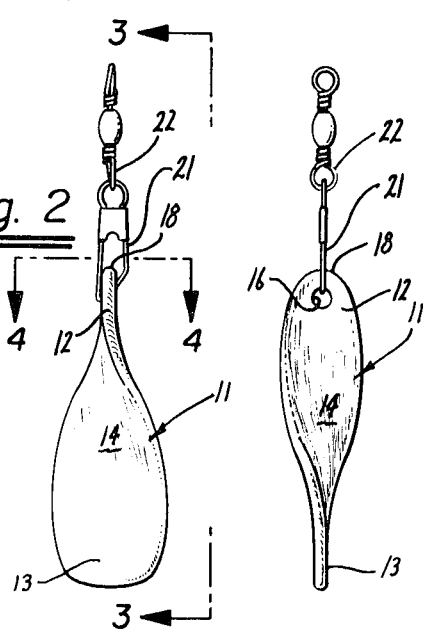
Fig. 2
Fig. 3
INVENTOR.
Lloyd J. Martin
BY Warren, Rubin
Brucker + Chickering
Attorneys

United States Patent Office 3,609,908
Patented Oct. 5, 1971

3,609,908
FISHING LINE SINKER
Lloyd J. Martin, 764 S. 5th St., 2, Elko, Nev. 89801
Filed Dec. 18, 1969, Ser. No. 886,219
Int. Cl. A01k 95/00
U.S. Cl. 43—44.97
2 Claims

ABSTRACT OF THE DISCLOSURE

A fishing line sinker having a relatively narrow flattened leading end portion and a relatively broad flattened trailing end portion and a smooth continuously twisted curved midsection disposing the end portions in substantially perpendicularly-related planes and having a surface configuration and mass distribution providing automatic gravitational orientation of the body to a stable rest position with the leading end portion disposed in a substantially vertical plane for swivel threading action through narrow crevices which would otherwise foul the sinker.

---

The invention relates to fishing tackle and more particularly to weights used on fishing lines in conjunction with hooks, lures, and the like, to maintain the latter at the desired fishing depth.

Frequently, the weights or sinkers used on fishing lines will gravitate into the restricted confines of narrow crevices formed by rocks, plant growth and the like and become fouled therein with attendant loss of the fishing tackle attached to the line. An object of the present invention is to provide a fishing line sinker of the character described which will function automatically to free itself from narrow crevices and the like upon being drawn through the crevice by the fishing line upon reeling in of the fishing tackle.

The invention possesses other objects and features of advantage, some of which with the foregoing will be set forth in the following description of the preferred form of the invention which is illustrated in the drawing accompanying and forming part of this specification. It is to be understood, however, that variations in the showing made by the said drawing and description may be adopted within the scope of the invention.

Referring to said drawing:

FIG. 1 is a perspective view of a fishing line sinker constructed in accordance with the present invention and is shown operatively attached to a fishing line.

FIG. 2 is a plan view of the sinker.

FIG. 3 is a side elevation of the sinker as depicted by lines 3—3 of FIG. 2.

FIG. 4 is an end view of the sinker as depicted by lines 4—4 of FIG. 2.

The fishing line sinker of the present invention comprises briefly a body 11 of water-impervious, heavier-than-water material, such as lead, having a relatively narrow flattened leading end portion 12 and a relatively broad flattened trailing end portion 13 of substantially equal thickness. End portions 12 and 13 are connected by a smoothly continuously twisted curved midsection 14 having a material thickness generally corresponding with the thickness of the end portions 12 and 13 are disposing these end portions in substantially perpendicularly-related planes. Means 16 provide a swivel line connection to the leading end portion 12, and the surface configuration of and the mass distribution in the body provide an automatic gravitational orientation of the body on a supporting surface, as seen in FIG. 1, to a stable rest position with the leading end portion 12 disposed in a substantially vertical plane.

As will be understood, most rock crevices, as depicted in FIG. 1, on the bottom of fishing waters, will have a more or less upright orientation. The present sinker is so constructed as to always come to rest on a bottom supporting surface with the flattened leading edge 12 in an upright position. Consequently, as the fishing line 17 is reeled in, the narrow flattened leading end 12 will enter the crevice and the sinker will thread its way through the crevice with a smooth rotating action thus coming free of the rocks in which an ordinary sinker would snag and lock solidly into the rocks with an attendent loss of the fishing tackle attached to the line. It is important that the curvature provided by the midsection of the sinker have a low, slow rolling pitch and extend smoothly and continuously over the majority of the length of the sinker and that the bulk of the weight of the sinker be located in the broad flattened trailing end so as to cause the narrow flattened nose 12 of the sinker to stand up for initial entry into the restricted exit openings which are found between rocks, plant growth, and the like. Where the exit opening from between rocks and the like is disposed off from vertical, the sinker will align itself for rotationally threading through the opening as above described by imparting slight jerks to the fishing line which will cause the rounded nose of the sinker to properly enter the crevice. The leading end portion 12 is preferably formed with an opening adjacent the leading edge 18 and providing the aforesaid fishing line connection 16. As here shown, the clip 21 of a standard fishing line swivel 22 may be threaded through opening 16 for fastening the sinker to the line.

The sinker may be formed in a plurality of successively increasing weights from about ¼ ounce to 4 ounces or more and each size will have the characteristic shape and weight as above described with the curvature extending over the majority—up to about 90 percent—of the length of the sinker and with the bulk of the weight in the broad flattened trailing end of the sinker. It has been found that sinkers fashioned in accordance with the present invention are practically snag-proof in the rocky bottoms of fishing waters.

I claim:

1. A fishing line sinker comprising,
    a body of water-impervious heavier-than-water material having a relatively narrow flattened leading end portion and a relatively broad flattened trailing end portion of substantially equal thickness,
    said end portions being connected by a smoothly continuously twisted curved midsection having a material thickness generally corresponding to the thickness of said end portions and disposing said end portions in substantially perpendicularly-related planes,
    means providing a swivel line connection to said leading end portion, and
    the surface configuration of and mass distributions in said body providing automatic gravitational orientation of said body on a supporting surface to a stable rest position with said leading end portion disposed in a substantially vertical plane.

2. A fishing line sinker as defined in claim 1, said leading and end portion being formed with a forwardly rounded leading edge and with an opening providing said means for connection of a fishing line thereto, and
    the curvature provided by said midsection extending over the majority of the length of said body.

References Cited

UNITED STATES PATENTS

| 2,256,346 | 9/1941 | Mathie | 43—42.52 X |
| 2,653,409 | 9/1953 | Hancock | 43—42.51 |
| 3,359,676 | 12/1967 | Crossan | 43—44.97 |

SAMUEL KOREN, Primary Examiner

D. J. LEACH, Assistant Examiner